United States Patent
Rentschler

[15] 3,687,045
[45] Aug. 29, 1972

[54] CAMERA SHUTTER MECHANISM

[72] Inventor: Waldemar T. Rentschler, Calmbach/Black Forest, Germany

[73] Assignee: Prontor-Werk Alfred Gauthier, G.m.b.H., Calmbach/Schwarzwald, Germany

[22] Filed: Nov. 27, 1970

[21] Appl. No.: 93,035

[30] Foreign Application Priority Data

Dec. 1, 1969 Germany............P 19 60 226.7

[52] U.S. Cl..................95/59, 95/10 CT, 95/53 EB, 95/60
[51] Int. Cl. ...........................................G03b 9/18
[58] Field of Search........95/59, 60, 62, 10 C, 10 CT, 95/53

[56] References Cited

UNITED STATES PATENTS 3,509,805  5/1970  Engelmann et al. ......95/62 X
3,459,112  8/1969  Starp et al. ..................95/60

FOREIGN PATENTS OR APPLICATIONS 1,217,200  5/1966  Germany......................95/59
608,091    9/1960  Italy..............................95/59

Primary Examiner—Joseph F. Peters
Attorney—March, Le Fever & Wyatt

[57] ABSTRACT

There is provided herewith an improved photographic camera having an objective lens with a constant diaphragm aperture. A shutter mechanism comprises a single main shutter blade movable back and forth by an opening and closing impulse over the diaphragm aperture. In conjunction with the main shutter blade there is a cover blade which moves in a plane parallel to the plane of movement of the main shutter blade, both sweeping over the diaphragm aperture. The cover blade is spring biased against the main shutter blade and follows the movement thereof.

8 Claims, 20 Drawing Figures

Patented Aug. 29, 1972
3,687,045
4 Sheets-Sheet 1
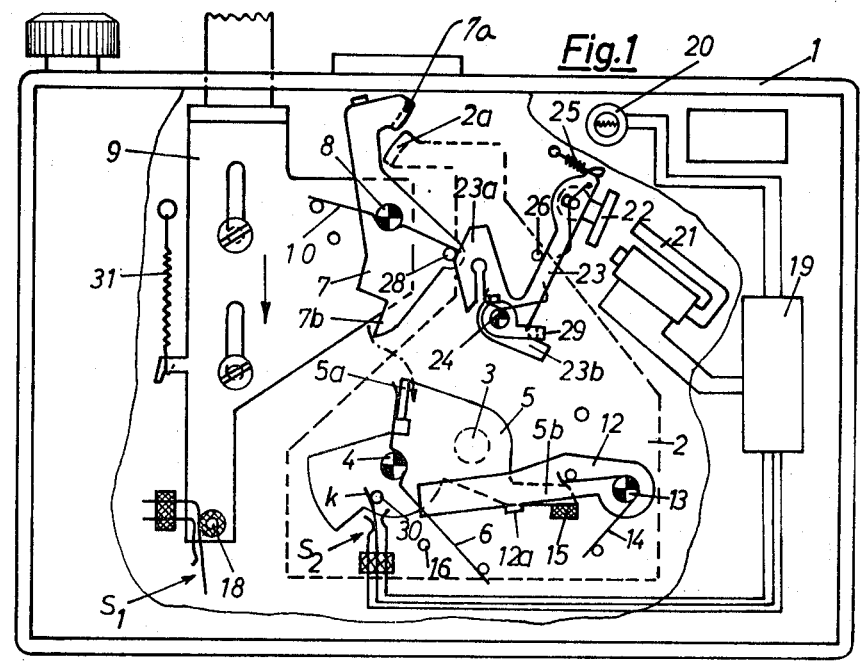
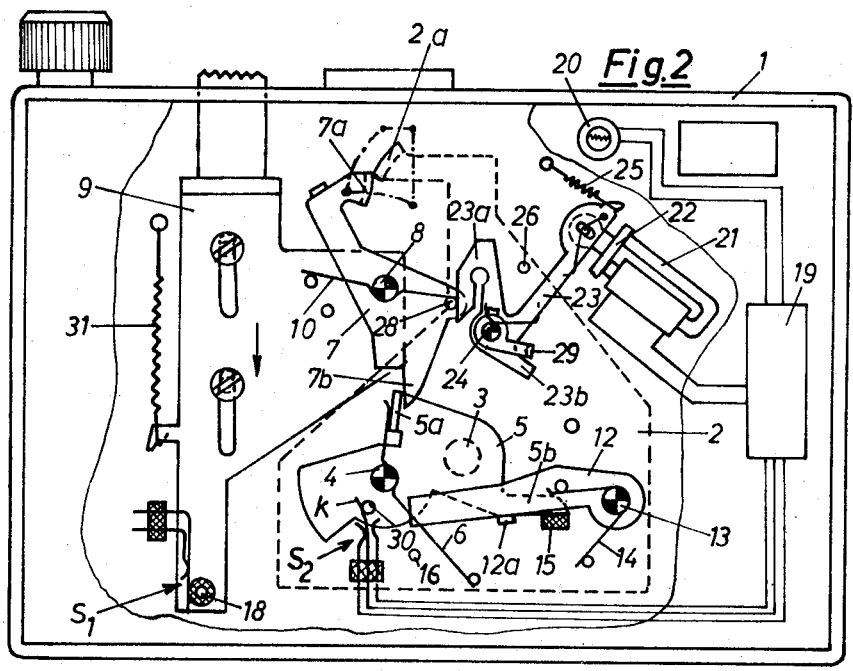
INVENTOR
Waldemar T. Rentschler
BY
Arthur A. March
ATTORNEY

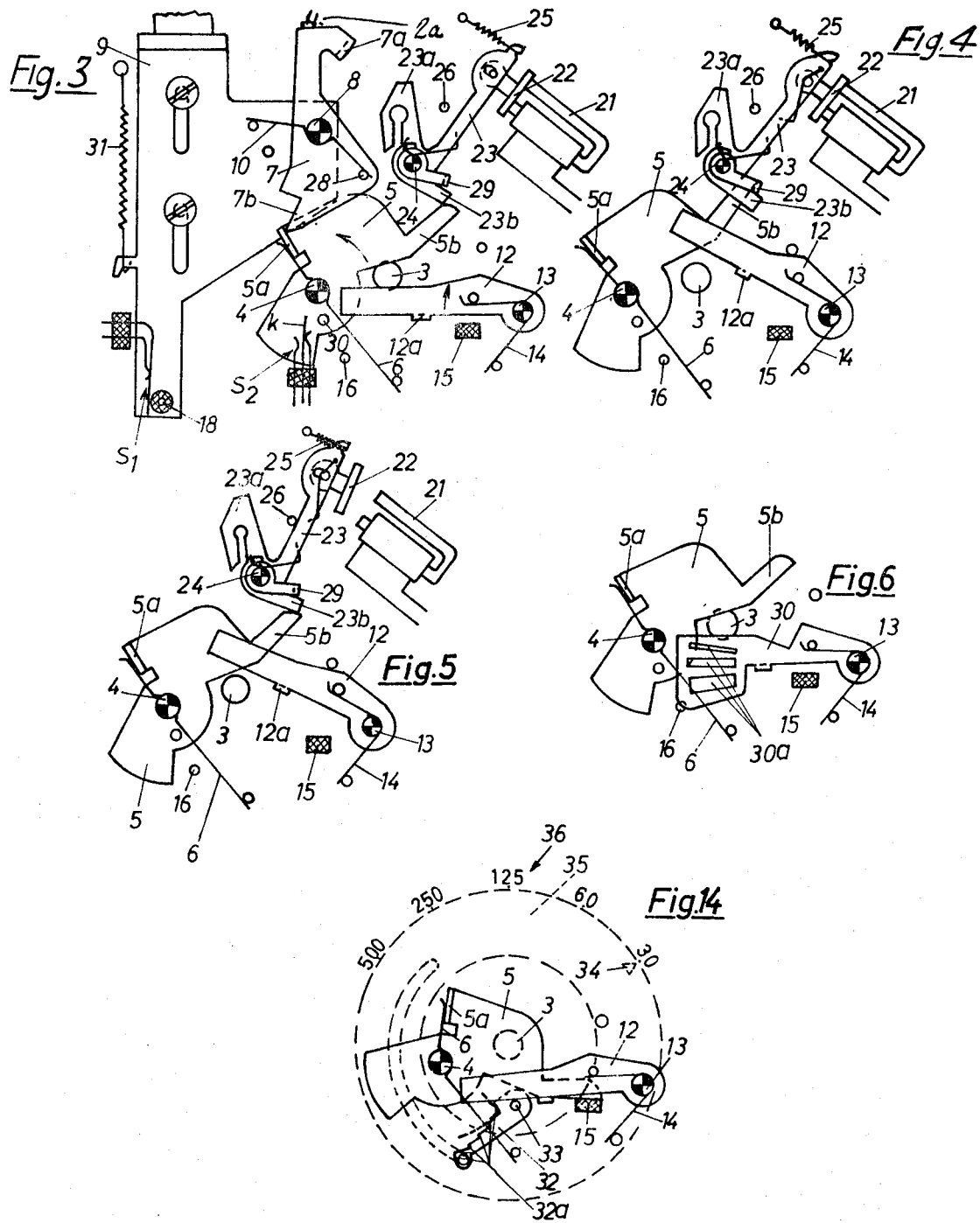

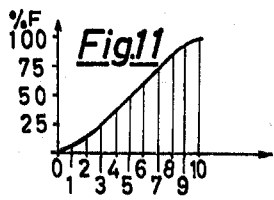
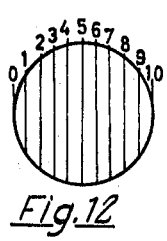
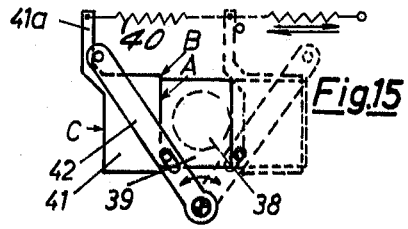
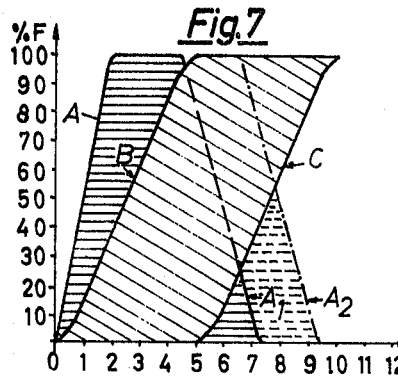
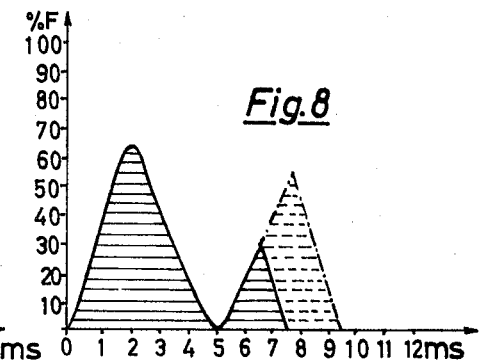
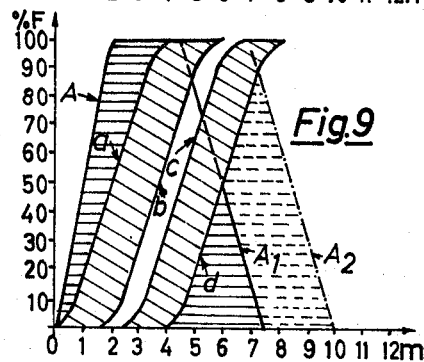
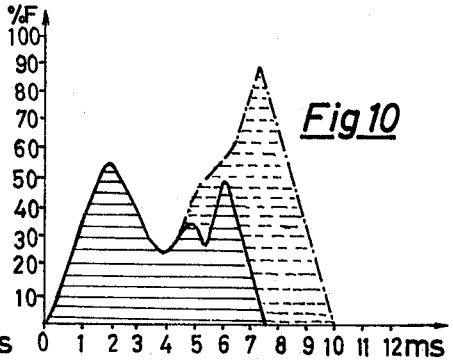
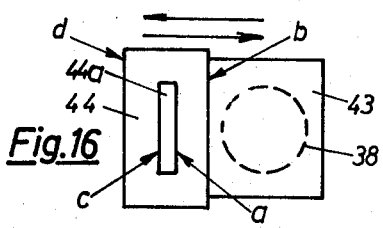
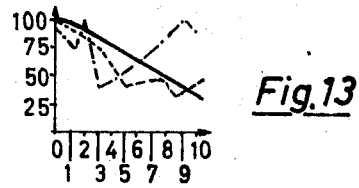

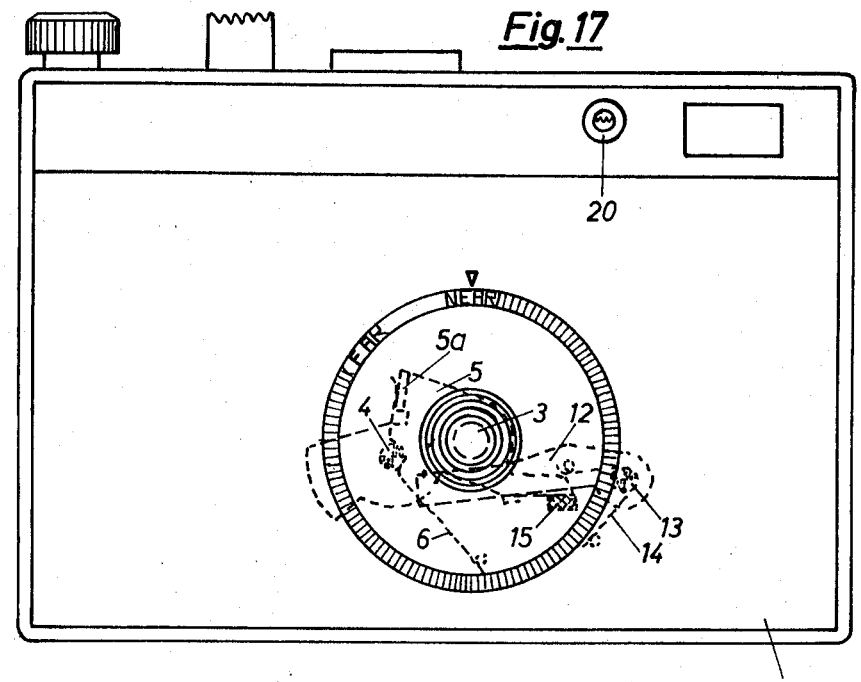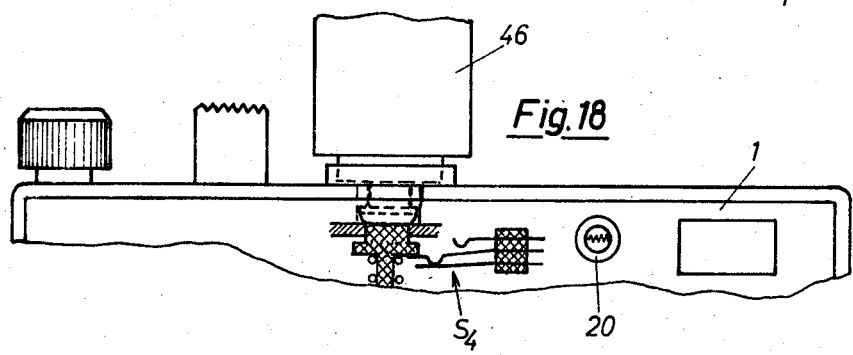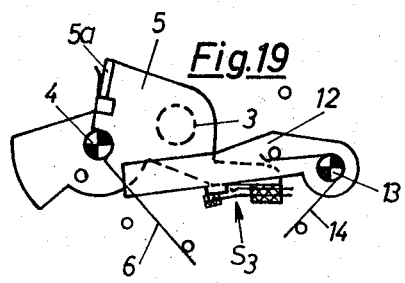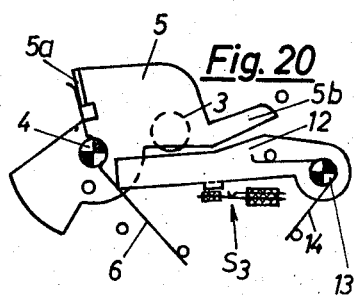

CAMERA SHUTTER MECHANISM

This invention relates to a photographic camera with an objective that preferably works with a constant shutter opening and with a shutter with a single shutter blade moved back and forth across the shutter opening by an opening and closing drive mechanism.

Among the widely distributed cameras of the lower price groups the objectives built in, for the most part, have a constant shutter opening with a single shutter blade movable back and forth across the shutter opening by an opening and closing drive mechanism. The effective shutter opening of the objective is preferably set into the area of 1:11, in some cases also in the area of 1:8, while the shutter opening has a diameter of about 5mm. Owing to the simple structure of these shutters their shortest exposure time usually is about 1/100 sec; at best 1/200 sec.

Cameras of the aforementioned type are essentially designed to serve the "fair weather photography" of so-called "snapshot amateurs." This group of buyers accepts the disadvantage of a relatively restricted working range in return for a low purchase price. The limitations of the working range are established, on the one hand, by the fact that the photographic activity must end as a level of illumination which is not yet really low, specifically at about 1,600 Apostilb ( this corresponds to pairing aperture "8" at 1/30 sec and 18 DIN FE), while on the other hand, when films of medium sensitivity are used, at pairing of aperture "8" and 1/100 sec over exposure of about two aperture levels may result when the illumination is intense.

If, in the interest of an expanded photography range when light intensity is low, the aperture of the objective is opened wider, which, on the basis of optical quality of many simple objectives, is possible without trouble, the danger of excess exposure is increased.

On cameras with shutters with electronic exposure time setting as well as an objective with fixed shutter 1:8 the working range does not actually end at aperture "8" and 1/30 sec, but here the limit of the time range for photographs is out of hand, for which a dislocation in the direction of lower light intensity would be desirable. Amateur photographers desiring an enlarged working range of their cameras, can therefore not use cameras of the above type, although the quality of the pictures in the working range of this camera are on a remarkably high level, both from the point of view of the quality of the objective as well as the precision of the exposure time setting.

The basis of this invention is the development of cameras of the above type with but nominal additional expenditure in design and thus cost in such a direction that an extension of its past working range is achieved. Such extension can be seen either in the employment of objectives with greater light intensity in order to prolong thereby the "daylight-photo-day" for the camera user, but also in the reduction or total elimination of the danger of over-exposures. The second goal is also important since it is true that black-and-white films have considerable leeway in exposure and therefore are not overly sensitive to excess exposures. On the other hand, color films are exposed with much more exactness when certain demands are made on the quality of the color pictures.

To arrive at a solution of these problems and achieve these ends the invention proposes that an additional cover blade is assigned to the shutter blade. This additional cover blade moves on a plane parallel to the plane of motion of the shutter blade and is designed to sweep out the shutter opening. The additional blade, under pressure of a spring, is in direct contact with the shutter blade, respectively, with a part connected to it (the shutter blade). By this means, while outside the shutter opening, it is assigned to the shutter blade in such a manner that it follows its opening movement up to either a fixed stop, or to a stop provided on the shutter blade itself in order to be moved back immediately thereafter into the position outside of the shutter opening, in opposition to the effect of the spring which is attached to it by the shutter blade returning to the closed position. This means that opening as well as final closing of shutter aperture is the task of the shutter blade as in the conventional cameras, which are the type from which the design of the invention was started. However, promptly after the inception of the opening movement of the shutter blade, the cover blade is in a position to sweep out the shutter aperture and thus in following; to cover it partially, and to cover it fully temporarily. The cover blade, consequently has the character and the function of a cover leaf for temporary action.

How this is conceived in detail, and other advantages are derived from the specific design of the invention, is shown in the drawing and also described below by two designs and application examples.

The drawings show:

FIG. 1 represents a view of the inside of a camera with a single blade shutter (automatic-shutter) in the original position which it (the shutter) assumes before the release is actuated;

FIG. 2 shows the same arrangement as in FIG. 1, in a motion phase during the cocking process of the shutter;

FIG. 3 is a partial description of the shutter system depicted in FIGS. 1 and 2 with the shutter blade freeing the passage through the objective, and with the cover blade following at lower speed;

FIG. 4 shows the shutter system in the position in which the passage through the objective is fully freed, whereby the shutter blade is held by an electromagnetic-mechanical blocking device;

FIG. 5 details the shutter system after release by the locking device on the way of returning to the closed position;

FIG. 6 shows a further design example of an automatic shutter of the type shown in FIG. 1 through 5 wherein a cover blade with several light slits is assigned to the shutter blade;

FIG. 7 is a "free plane" time diagram as it is furnished by a single blade shutter with a holohedral cover blade;

FIG. 8 is a "total plane" time diagram corresponding to the "free plane" diagram according to FIG. 7;

FIG. 9 is a "free plane" time diagram of a single blade shutter, the cover leaf of which is additionally provided with a slit;

FIG. 10 is the "total plane" time diagram that corresponds to the "free plane" time diagram of FIG. 9;

FIG. 11 is a plane "line" diagram of the single blade shutter fitted with the additional cover blade;

FIG. 12 shows the outline of an objective aperture with plane "lines" drawn in:

FIG. 13 is a diagram evidencing that the relation of the exposure times valid for the individual lines" of the shutter aperture is not less favorable than is the case with conventional shutters;

FIG. 14 shows a single blade shutter equipped with mechanical means for time control and with an additional cover blade;

FIG. 15 illustrates another design possibility of a single blade shutter with a shutter blade that is movable back and forth in a straight line and with an additional full plane cover blade, in which the open position of the shutter blade system is indicated by dotted lines;

FIG. 16 illustrates an additional example of a single blade shutter with a shutter blade that oscillates in a straight line and a cover blade provided with an additional illumination slit;

FIG. 17 is a front view of a camera with the setter that serves to set the objective;

FIG. 18 is a partial view of a camera with the switch that closes the flash circuit when a flash cube is mounted; and FIGS. 19 and 20 show the cooperation of the cover blade with the flash contact provided for the ignition of a flash bulb.

In the drawings 1 indicates the housing of a photographic camera that is only schematically indicated. The camera is equipped with a single blade shutter which functions according to the principle of an automatic shutter. To mount the movable parts of the shutter system, there is a plate 2, indicated by dotted line in FIGS. 1 and 2, which has an exposure opening 3. According to the design example shown in FIGS. 1 through 5 the shutter blade 5 mounted in pivoting fashion on a fixed axle 4, and to this shutter blade 5 a closing spring 6 is attached. A drive lever 7 of two-arm-design which sits in pivoting fashion on pin 8 works with the shutter blade 5 in a manner which will be more closely described below.

Pin No. 8 is mounted on the cocking and release slide 9 that is connected in movable fashion to the camera housing 1. By means of a tang 2a bent from a foundation plate 2, and by means of a further tang 7a bent from an arm of a drive lever 7, there is created a simple positive guidance for this lever, a guidance which imparts to it, relative to the drawing in FIGS. 1 and 2, a counter-clockwise torque when the cocking and release slide 9 is depressed. This torque momentum is absorbed by a drive spring 10 which rests on one end of the drive lever 7 and on the other end of the cocking and release slide 9. The drive spring 10 stores the cocking force. Since upon cocking and release of the camera-release-mechanism 9, the drive lever 7, which it carries, carries out a translating movement, during which the finger-like end 7b of the lever 7 that faces the shutter blade 5, assumes a course of movement indicated by a dotted line in FIG. 1. This part eventually comes to rest before tang 5a that is formed on shutter blade 5. This means that after the disengagement of the drive lever 7 (FIG. 3) this lever drives the shutter blade 5 in opposition to the effect of the closing spring 6 with which it is connected and thus it moves the blade, turning it around the fixed bearing pin 4 whereby the exposure aperture 3 is uncovered.

As the drawings in FIG. 1 through 5 also show, a cover blade 12 is assigned to the shutter blade 5 for the purpose of immediate and successively intensifying covering of the freed exposure aperture 3. This blade 12 is placed upon a pin 13 in pivoting fashion and can be driven by a spring 14. Pin 13 is mounted on foundation plate 2. On the cover blade 12 a tang 12a is formed, by means of which the blade, which is under the influence of spring 14, is supported by the shutter blade 5 proper. The assignment and positioning of the cover blade 12, relative to the shutter blade 5 is, in this case, so arranged, that, in the event of the opening movement of the opening and closing system, both blades execute turning movements in opposite directions around their respective pivot pins 4 and 13 (FIG. 3). Furthermore it is conditional on perfect exposure, that the cover blade 12 follows the opening move of the shutter blade 5 with lower acceleration and less run-off speed, which can be achieved in a simple manner; for example by weaker tension of spring 14 relative to spring 10 which works on drive lever 7. In the same way, the strength of the closing spring 6, which works on shutter blade 5, is also weaker in relation to the force of spring 10.

While, for setting the shutter blade 5 in its original position, a stop 15 is provided, preferably made of elastic material, for instance, of rubber, a stop 16, serving to limit the swing-out range of the blade, can be made of hard material. Concerning the drive of the movable shutter parts especially, the force of springs 13 as indicated above — can be used. However, this does not exclude the use of a magnet force to open and close shutter blade 5. This type of drive can be advantageous when electronically functioning switching is being used to control time. On the other hand, for the cover blade 12 a spring-powered drive is provided exclusively for reason of favorable cost.

FIGS. 1 to 5 show in principle how the aforementioned control arrangement serving to set the time, has to be made in detail, and how it can work together with above described shutter design, regardless of which type of force effects the opening movement of the shutter blade 5. One switch in these drawings is designated as $S_1$; it is located in the moving range of the switch pin 18 mounted on the cocking and release slide 9. In the contact position, achievable by the switch $S_1$ which is brought about by the beginning of the movement of the cocking and release slide 9, the circuit of a generally known electronic time setting device 19, which is merely schematically indicated, on to a power source that is not further illustrated. For the purpose of light dependent control, the camera can be fitted with a light sensitive element, for instance a photo-resistance 20, the resistance value of which determines the time interval during which the shutter blade 5, as shown in FIG. 4, is held in the open position by an electromagnetic mechanical blocking device. This device encompasses principally an electromagnet 21, an anchor 22, which works with it (the electro-magnet) as well as an anchor lever 23 that carries the anchor. The anchor lever rests on a fixed pin 24 in pivoting fashion. A retracting spring 25 in contact with anchor lever 23 holds it (the lever) in a final position determined by pin 26 (FIG. 1). Anchor lever 23 is furthermore provided with an additional self-springing arm 23a which is assigned in such a fashion to the drive lever 7 respectively to a setting pin 28 mounted on the lever, that when pressing down the cocking and release slide 9, the anchor 22 is forcibly (automatically) brought in contact before drive lever 7 slips off tang 2a on the electro-magnet 21. A hold-pawl 29, supported in spring fashion on a further arm 23b of the anchor lever 23, is provided for the purpose of holding shutter blade 5 — now in open position— until anchor 22 and anchor lever 23 are released by spring 25 for the return setting movement after completed switching of the electronic time setting device. To render the coordination of holding pawl 29 and shutter blade 5 possible in a simple way the latter is provided with a fingerlike extension 5b, behind which a bent part of the holding pawl 29 snaps in, as soon as, according to FIG. 4, the shutter blade 5 has reached the open position.

The designation $S_2$ denotes a charge starting switch that is known and is located in the circuit of the electronic time setting device 19. In the original position of the shutter blade 5, this switch is in contact owing to a pin 30 which is mounted on the shutter blade 5 itself and influences its contact spring K, by which (in turn) a short circuit is created in the condenser of the time setting device. When the shutter blade 5 opens, the contact spring K follows the contact pin 30 and opens the switch, thereby starting the time setting process. Immediately after the opening of the short circuit contact, the contact spring K comes to rest upon another contact assigned to it, a contact which is a parallel-contact to the switch $S_1$ which has the task of keeping the battery circuit closed, even in the event that the cocking and release slide 9, under the influence of the retracting spring 31, is relieved before the end of the time setting process.

The above described camera design with single blade shutter and (an) additional cover blade works as follows:

When, for the purpose of taking a picture, the cocking and release slide 9 is pressed down in the direction of the arrow in FIG. 1, tip 7b of the drive lever 7 moves along the line of movement indicated by dashdots in FIG. 1. Tip 7b precedes in front of the tang 5a of the shutter blade 5. Anchor 22 is forced into contact with the magnet 21 by pin 28 which is dependent on and moves synchronous with the cocking movement of the slide. When finally, in the course of the cocking and release movement, tang 7a of the drive lever 7, comes out of touch with the positive guide 2a, then the drive lever 7, responding to the relatively strong spring 10 with which it is in contact, carries out a clockwise [rotary] motion around the bearing pin 8. When this happens, the shutter blade 5 is taken along; the shutter blade 5 turns counterclockwise at high angular velocity around its bearing pin and thereby opens the exposure aperture 3. Moved by a lesser accelerating force, cover blade 12 follows the preceding shutter blade 5, and by this motion it covers again the previously free exposure aperture 3. For further coordination of the cover blade 12 with the shutter blade 5 in connection with the closing of the shutter aperture, two events, differing one from the other in principle, can occur:

1. If the cover blade 12 has not freed fully the exposure aperture 3 when "passing over" at the time when the shutter blade 5 moves back in the closing direction after sliding off the tang edge 7b then the shutter blade, so to speak, takes along the cover blade "on the way" to closing.

2. If, however, the cover blade 12 as well as the shutter blade 5 fully frees the exposure aperture 3 before the shutter blade starts to move for the closing, then the shutter blade is thereby fully "slipped under," which means that the cover blade is taken along by the shutter blade promptly at the outset of the closing.

It is, however, characteristic in both cases that the cover blade 12 has no functional significance when the exposure aperture is being closed, as the closing of the exposure aperture 3 is exclusively the task of the shutter blade 5. The closing process is being initiated always after release of the anchor 22 respectively of the anchor lever 23 by the electro-magnet 21 as a result of the through-switching of the electronic time setting device. When this happens, then anchor lever 23 which — as shown in FIG. 5 — carries the holding latch 29, lifts the blocking of shutter blade 5 that is held in the open position, whereupon the shutter blade, driven by the closing spring 6, changes over into the closed position, while taking along at the same time the cover blade 12. The moving path covered by tang 7a of the drive lever 7 when a picture is taken is indicated in FIG. 2 by a dash-dotted line which also shows that the drive lever can reach the original position shown in FIG. 1 after return by the cocking and release lever 9 merely by a little counter-clockwise turn around pin 8. To achieve this, the drive lever 7 can, for instance, be coupled to the film transport device of the camera (which is not illustrated), in such a manner, that when the film is moved the drive lever is moved also and is guided into the ready position shown in FIG. 1.

A further design example is shown in FIG. 6. In structure and function it very largely corresponds to the arrangement according to FIGS. 1 through 5. For this reason the identical components have received the same reference symbols.

To achieve the desired effect, a cover blade 30 with one or more slots 30a of different or equal dimensions, was assigned to the shutter blade 5 which moves back and forth during the exposure process. Fitting the cover blade 30 with additional slots 30a serves to achieve a specified exposure characteristic; an exact gradation of exposure time. This is important, particularly for cameras with electronic exposure time setting where exposure times are supposed to be proportional to the resistance value of the photoresistance and thereby to the light intensity. It must therefore be assured, for instance, that when a light intensity reduced by one half prevails [relative to a specific light intensity] a doubling of the exposure time takes place. Providing additional light slots 30a in the cover blade 30 is advantageous to fulfilling this requirement. Such a design guarantees not only a minimal value for the shortest effective time, but also a good exposure time gradation in a camera with photo-resistance control. This is illustrated in a comparison of the two "free-plane" time diagrams illustrated in FIGS. 7 and 9 of which the first reflects the curves developed in a design of a full-plane cover blade, and the second the curves developed by the use of a slotted cover blade. A dash-dotted line $A_2$ has been drawn into both diagrams. This line indicates the closing of edge A after an exposure time twice as long as the shortest effective time. Since in the example according to FIG. 7 the shortest effective time is given as 1.8ms, the line $A_2$ effects a displacement of 1.8ms on the time axis to the right, relative to line $A_1$. When a photo-resistance control is used, this means that the setting of the electronic circuit on the basis of the shortest effective time of 1.8ms is so arranged that when the light intensity is halved, and thus the resistance value of the photo-resistance is doubled, the electronic time setting device has finished after a total of 1.8ms + 1.8ms = 3.6ms following the starting signal. In the diagram according to FIG. 9, in which the shortest effective time is 2.4ms, the line $A_2$ is displaced in an analogous manner by 2.4ms relative to the line $A_1$ to the right on the time axis.

FIGS. 8 and 10 illustrate the total planes resulting from consideration of line $A_2$, and the shape of the curve relating to the line $A_2$ is illustrated by a dash-dotted line. For the example according to FIG. 7, the result is that, instead of a theoretical time of 3.6ms an actual time of 2.6ms is available which corresponds to a difference of about minus 28 percent from the theoretical time. The difference, on the other hand, between actual time and theoretical time occurring as shown in FIG. 9 is much smaller. Instead of a theoretical time of 4.8ms the actual time is about 4.3ms which equals a difference of only about minus 11 percent relative to the theoretical time.

For the next time interval also, which leads, in the example according to FIG. 7, to a theoretical time of 7.2 ms and in the example according to FIG. 9 to a theoretical time of 9.6ms, there are differences to the minus side of about equal size, while with the following "time intervals the deviations become increasingly smaller. From this can be seen that the "slot design" used in the example according to FIG. 9 contributes to a much smaller divergence from the actual time to the theoretical time at the time gradation adjacent (following) the shortest actual time. It should be mentioned in this connection that the differences existing in the example according to FIG. 7 of barely minus 30 percent is still just inside the acceptable tolerance for these short time intervals. However, with the example according to FIG. 9 it was possible to show clearly that without further equipment and only by arranging for one or several slots, a marked improvement of the tolerance situation of the gradation "times" (time intervals) is obtainable in the "short-time-range" of a camera. It is not even necessary that the slot, or slots, have a uniform width throughout their length; they may feature changing slot width for instance a wedge shape. This opens a further possibility for fine adjustment in the sense of an equal gradation of the longer exposure times adjacent to the shortest actual time.

To sum up, it thus demonstrated that by assigning a slotted cover blade to the actual shutter blade it is not only possible to achieve a significant shortening of the shortest effective time compared to that of a traditional shutter design, but that in addition, also with automatic exposure time setting, as known from shutters with electronic time control and photo-resistance control, a sufficiently accurate gradation of the exposure times connected to the shortest effective time is assured in relation to the theoretical characteristic.

As previously already indicated, the assignment of a cover blade to an oscillating shutter blade for cameras with exposure time setting of any kind is of importance, even for cameras with time control by means of run off of a mechanical retarding mechanism that slows down or interrupts the shutter blade system, respectively with a reflex stop effecting limitation of the deflection range upon opening and closing as well as its (the shutter blade system's) return. In lieu of other forms of shutter designs with mechanical time control, FIG. 14 shows one by which the deflection range of shutter blade 5 is more or less limited through an adjustable reflex stop 32 carrying graduations 32a. If the time setting member, as shown, is set for instance to 1/30 sec, the gradation 32a, positioned closest to the axis 33 of the reflex stop 32, becomes effective, whereby the shutter blade registers the largest deflection. Contrarily the shutter blade comes in contact with the gradation 32a after only a short deflection range; gradation 32a is furthest away from pivot 33 of the reflex stop 32. This happens when the marker 34 of the merely schematically indicated time setting member 35 has been set to the time value 1/500 sec of the scale 36. But the situation is always that the additional cover blade 12 or 30 follows the actual shutter blade 5 beginning with the opening movement.

In FIG. 11 a plane-"line"-diagram is shown, which refers to a plane circle depicting the exposure aperture 3 according to FIG. 12, and where the plane is divided into 10 strips by use of parallels which, in the following text are designated as "lines." Further there is a direct relation each "line" number and the area freed when the corresponding "line" is reached. This means that when the opening system has freed the entire exposure aperture, i.e. when all area strips from 0 to 10 have been stroked over (swept clear), a 100 percent free plane has been achieved. When fewer strips are stroked over (swept clear) a correspondingly lower percentage is achieved, as FIG. 11 shows.

FIG. 15 contains a schematic sketch of a slide shutter, wherein a cover blade 41 also formed from a slide is assigned to a straight linear-guided, back and forth moving slide 39. This slide effects both the opening and the closing of the exposure opening 38. A cover blade 41, also formed from a slide and under the influence of a spring 40 is also assigned to slide 39. Directionally opposed arrows in the drawing indicate the drive and closing forces for the opening and closing slide 39, while the element serving to transmit the drive forces, which may, for instance, be designed as a lever, is designated as 42. The lever and the slide 39 may be coupled with one another in form-locking fashion with the aid of a pin-slot connection, whereas the cover blade 41 is positively (or in force-locking manner) connected to the lever by means of an arm 41a which is under the influence of spring 40. A designates that edge of the opening or closing slide 39 which determines the exposure whereas the edges of the cover blade 41 are designated as B and C. While FIG. 15 refers to a slide shutter with a full surface cover blade, FIG. 16 illustrates another design example of a slide shutter in which a cover blade 44 fitted with a slot 44a is assigned to the back and forth moving slide shutter 43. Guidance and drive of shutter blade 43, and of cover blade 44, can be accomplished in the same manner as shown in FIG. 15. The drive forces active during the exposure process are shown, for simplicity's sake, merely by two arrows which point in opposite directions.

According to the time diagrams in FIGS. 7 and 9 it was assumed that a single blade shutter in its traditional structure (design) possesses a shortest possible exposure time of about 5ms=1/200 sec, and that the opening time is about 2ms and the closing time about 3ms. This can be seen in he illustrations according to FIGS. 7 and 9 by the fact that line A passes 2ms and line $A_1$ passes 3ms, and that a distance of 5ms exists between the point on line A at which 50 percent of the opening area is freed, and the point on line $A_1$ at which 50 percent of the opening area is closed.

In the plane diagrams according to FIGS. 7 and 9 the opening characteristic of edge A of the shutter blade is designated as A and the closing characteristic of the same edge is designated as $A_1$. The diagram lines formed by the edges B and C (FIG. 15) and the edges $a,b,c$ and $d$ (FIG. 16) are furthermore, designated as B and C respectively as $a,b,c$ and $d$.

The drawings according to FIGS. 7 and 9 are called "Free-Area" -Time-Diagrams. This means that from each sketch the Free Area resulting from each position of shutter blade and cover blade are visible. The temporary covering of the exposure aperture caused by the cover blade is marked by one (full area cover blade) respectively two (slotted cover blade) shaded or lined "Area-Strips."

The time diagrams according to FIGS. 8 and 10, which are called "Total Surface"-Time-Diagrams, show a plotting of diagrams according to FIGS. 7 and 9 and reveal the percent of the exposure aperture which is freed by the shutter blade at every movement of the sweep. The zero point of the time scale is the beginning of the freeing movement of the exposure aperture by the shutter blade. The surface under the curves is thus a measure for the light passage through the shutter aperture i.e. for a definite quantity of light. To measure the progressivity of the combination design of a single blade shutter with a cover blade versus the traditional arrangement, the surface under the curves in FIGS. 8 and 10 should be compared with the surface under the curve path A, "100 percent line", $A_1$ in FIGS. 7 and 9. In the example according to FIG. 7 of an effective exposure time of 5ms=1/200 sec of the traditional design, this results in an effective time of 1.8ms=approx.1/550 sec for the camera described and illustrated while in the case of the example according to FIG. 9 the effective time achieved is about 2.4ms-about 1/420 sec. It is thus evident that by means of a single blade shutter to which a cover blade is additionally assigned, a shorter effective time can be achieved considerably less than half of the previous time while keeping the opening and closing drive forces of a traditional shutter. In all design variations the point of departure is a constant value of the effective shutter aperture.

In FIG. 13 it is shown that the relation of the valid exposure times of the above described type of shutter is not less favorable for the individual "lines" of the shutter aperture than is the case with shutters of traditional design. This means that the quality with reference to light intensity differences, characteristic and accepted in the known cameras, are assured in equal measure in cameras designed according to the invention. These light intensity differences result from the principle of functioning in the case of single blade shutters behind the lenses.

To take flash bulb photographs it is fundamentally necessary that the flash contact takes place timewise definitely dependent on the freeing of the shutter opening. In further development of the aforementioned design of a single blade shutter with additional cover blade, it is advantageous when taking flash bulb photographs, that the flash contact switch $S_3$ according to FIGS. 19 and 20 is actuated depending on the movement of the cover blade 12 in order to set the time for the flash bulb photo in such a manner that the shutter blade 5 and the cover blade 12 free the entire exposure aperture simultaneously, at least for a short time. To accomplish this result the focusing device is moved from the position heretofore defined to a flash operating position. If this prerequisite is met, then flash photos can be made with flash bulbs as well as with electronic flashes. However, in the case of electronic flashes it is necessary that contact be given only when the cover blade 12 also has freed fully the exposure aperture whereas when photographing with flash bulbs, contact can already be made at an earlier instant, for example, at the beginning of the movement of cover blade 12. While in FIG. 17 the use of the single blade shutter with additional cover blade is shown on a camera with objective setting FIG. 18 shows the design of a contact switch $S_4$, which, in known fashion, switches the photo-resistance off the electronic time setting control, depending on the mounting of a flash cube 46 onto the camera (position "Blitz"), and in lieu of the photo-resistance switches on a constant resistance, which results in a time suitable for flash bulb pictures, for example, 1/30 sec.

What is claimed is:

1. A photographic camera having an objective lens operating with a constant diaphragm aperture;
   a shutter having a single main shutter blade reciprocated by an opening and closing drive means across a shutter opening;
   a cover blade associated with said main shutter blade moving in a plane parallel to the plane of movement thereof;
   said cover blade being designed to sweep over the aperture and being spring biased against said main shutter blade such that the said cover blade follows the main shutter during the opening movement of the latter to a stop provided on said main shutter;
   said cover blade being subsequently moved by said main shutter blade on its return to a closed position;
   said cover blade returning to a position displaced from the aperture against the action of said spring biasing means.

2. A camera according to claim 1, wherein said main shutter blade and said cover blade execute opposite directions of rotation about their axes during movement.

3. A camera according to claim 1 wherein said cover blade is constructed as a lever-like cover with an unbroken surface.

4. A camera according to claim 1 wherein the force of the biasing spring acting on said cover blade is less than the drive force producing the opening and closing movement of the main shutter blade.

5. A camera according to claim 1 wherein said cover blade is a rotatable segment-like disc provided with one or more slits extending radially relatively to its center of rotation.

6. A camera according to claim 5, wherein said slits are of differing widths.

7. A camera according to claim 5, wherein said slits are wedge shaped.

8. A camera according to claim 1 which includes a flash contact focussing and a focusing device, said focussing device also acting as an exposure time setter and comprising a "flash" operating position, wherein an exposure time is set in the "flash" operating position during which the shutter blade and the cover blade simultaneously expose the full shutter opening at least briefly, and wherein the flash contact is actuable by movement of said cover blade.

* * * * *